(12) United States Patent
Matsusaka

(10) Patent No.: US 10,097,705 B2
(45) Date of Patent: Oct. 9, 2018

(54) IMAGE PROCESSING APPARATUS THAT EMPHASIZES IMPORTANT INFORMATION ADDED TO MARGIN REGION AND IMAGE FORMING APPARATUS INCLUDING THE SAME

(71) Applicant: Kyocera Document Solutions Inc., Osaka (JP)

(72) Inventor: Tetsuya Matsusaka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/663,621

(22) Filed: Jul. 28, 2017

(65) Prior Publication Data
US 2018/0034978 A1    Feb. 1, 2018

(30) Foreign Application Priority Data
Jul. 28, 2016   (JP) .................................. 2016-148967

(51) Int. Cl.
*H04N 1/00* (2006.01)
*H04N 1/04* (2006.01)
*H04N 1/387* (2006.01)
*G06K 15/02* (2006.01)
(Continued)

(52) U.S. Cl.
CPC ........... *H04N 1/0036* (2013.01); *G06F 3/125* (2013.01); *G06F 3/1242* (2013.01);
(Continued)

(58) Field of Classification Search
CPC ............. H04N 1/0036; H04N 1/00374; H04N 1/32128; H04N 1/32133; H04N 1/387;
(Continued)

(56) References Cited

U.S. PATENT DOCUMENTS 7,821,690 B2 * 10/2010 Yamada ............... H04N 1/3873
358/527
8,635,520 B2 * 1/2014 Christiansen ......... G06F 17/241
715/230
(Continued)

FOREIGN PATENT DOCUMENTS

JP    2003-080791 A    3/2003
JP    2004-032382 A    1/2004

*Primary Examiner* — Scott A Rogers
(74) *Attorney, Agent, or Firm* — James Judge

(57) ABSTRACT

An image processing apparatus includes a data input unit, an operation panel, a storage unit, and a control unit. The operation panel accepts a registration of a margin image and a setting of an emphasis region within the margin image. The storage unit stores data for emphasis including a registered margin image and positional data. The registered margin image is the margin image that has been registered, and the positional data indicates a position of the emphasis region in the registered margin image. When the control unit determines that the registered margin image is included in the page image data, the control unit performs an emphasis process on an image of a corresponding region whose position at the registered margin image included in the page image data is identical to a position of the emphasis region in the registered margin image included in the stored data for emphasis.

8 Claims, 9 Drawing Sheets

(51) Int. Cl.
*G06F 3/12* (2006.01)
*G06T 11/60* (2006.01)
*H04N 1/32* (2006.01)

(52) U.S. Cl.
CPC ..... *G06K 15/1872* (2013.01); *G06K 15/1885* (2013.01); *G06K 15/1889* (2013.01); *G06T 11/60* (2013.01); *H04N 1/0097* (2013.01); *H04N 1/00374* (2013.01); *H04N 1/00384* (2013.01); *H04N 1/00392* (2013.01); *H04N 1/00413* (2013.01); *H04N 1/044* (2013.01); *H04N 1/387* (2013.01); *H04N 1/32133* (2013.01)

(58) Field of Classification Search
CPC ........... G06K 15/1885; G06K 15/1872; G06K 15/1889; G06F 3/125; G06F 3/1242; G06T 11/60
See application file for complete search history.

(56) References Cited

U.S. PATENT DOCUMENTS

| | | | |
|---|---|---|---|
| 8,959,432 B2 * | 2/2015 | Sharkey | G06T 13/00 715/200 |
| 2007/0177207 A1 | 8/2007 | Ahmad | |
| 2008/0037873 A1 * | 2/2008 | Berkner | G06F 17/30905 382/176 |
| 2008/0062438 A1 * | 3/2008 | Lin | G06K 9/42 358/1.2 |
| 2018/0054531 A1 * | 2/2018 | Nishiyama | H04N 1/00222 |

* cited by examiner

Before Emphasis Process    After Emphasis Process

IMAGE PROCESSING APPARATUS THAT EMPHASIZES IMPORTANT INFORMATION ADDED TO MARGIN REGION AND IMAGE FORMING APPARATUS INCLUDING THE SAME

INCORPORATION BY REFERENCE

This application is based upon, and claims the benefit of priority from, corresponding Japanese Patent Application No. 2016-148967 filed in the Japan Patent Office on Jul. 28, 2016, the entire contents of which are incorporated herein by reference.

BACKGROUND

Unless otherwise indicated herein, the description in this section is not prior art to the claims in this application and is not admitted to be prior art by inclusion in this section.

At a typical image forming apparatus such as a printer, a multi-functional peripheral, a copier, and a facsimile device, one discharge destination (discharge tray) is sometimes stacked with printed matters of a plurality of print jobs. In this case, it is necessary to sort out own printed matters from printed matters of others. With respect to such problem, a technique regarding the sort of the printed matters has been proposed.

A following facsimile device has been proposed. The facsimile device has a color sort function that accumulates received image data, extracts a normal-resolution printing output color designated in the received image information to set it, detects whether fine-resolution print designation information, which is printed at a fine resolution, is included in the received image information or not, and when the facsimile device detects the fine-resolution print designation information, changes the setting from the set normal-resolution printing output color to a fine-resolution printing output color designated in the image information. This configuration proposes a sorting method of output paper sheets, and attempts to easily notify a user that the print has been performed in a fine-resolution print mode.

SUMMARY

An image processing apparatus according to one aspect of the disclosure includes a data input unit, an operation panel, a storage unit, and a control unit. The data input unit receives an input of data for job used for a job. The operation panel accepts a registration of a margin image located on a margin region preliminarily determined within a document in a page and a setting of an emphasis region within the margin image. The storage unit stores data for emphasis including a registered margin image and positional data. The registered margin image is the margin image that has been registered, and the positional data indicates a position of the emphasis region in the registered margin image. The control unit determines whether the registered margin image is included in page image data that is image data of a page based on the data for job or not. When the control unit determines that the registered margin image is included in the page image data, the control unit performs an emphasis process on an image of a corresponding region whose position at the registered margin image included in the page image data is identical to a position of the emphasis region in the registered margin image included in the stored data for emphasis, among the page image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
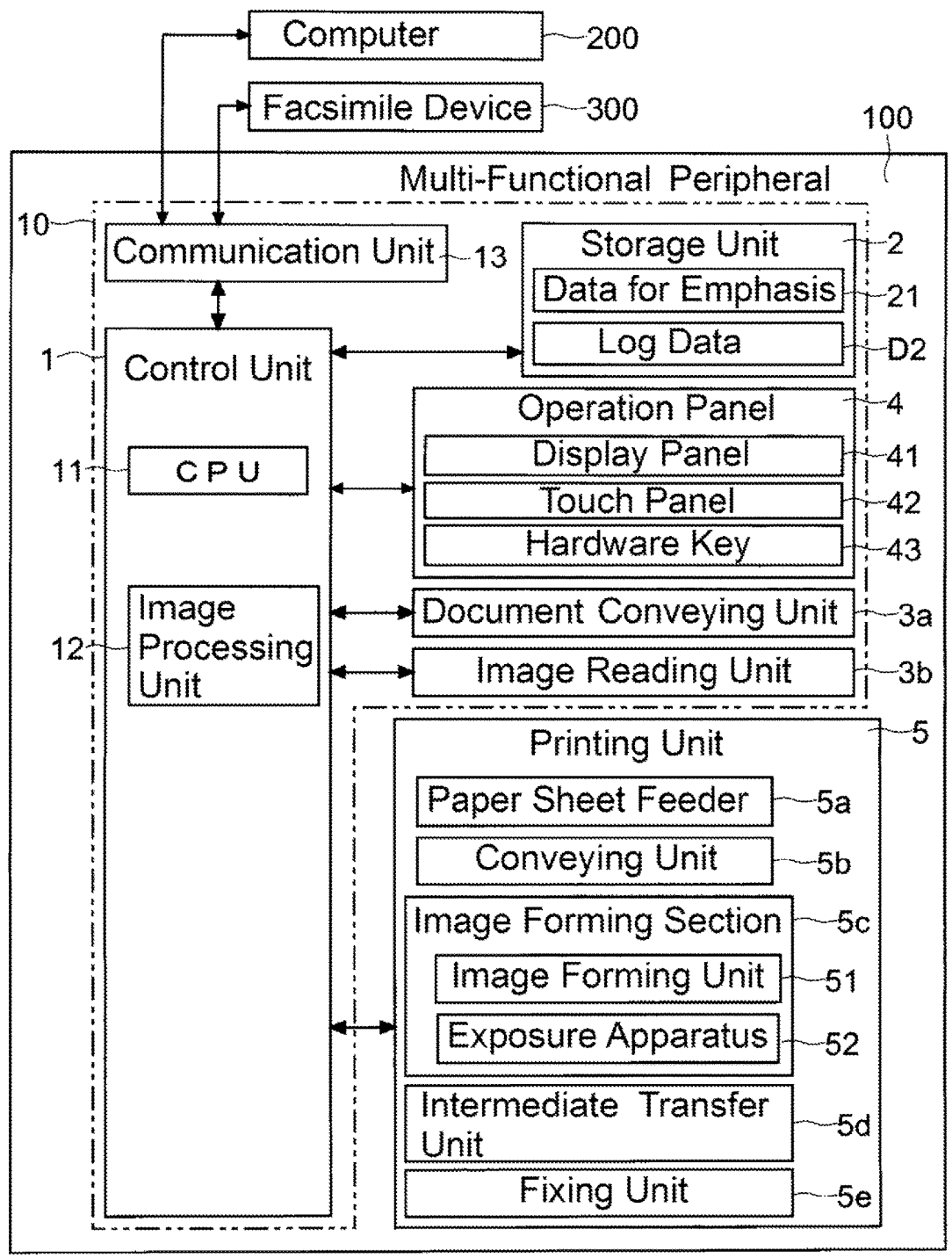
FIG. 1 illustrates an exemplary multi-functional peripheral according to an embodiment.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image processing apparatus 10 according to the disclosure, using FIGS. 1 to 12. The image processing apparatus 10 includes a control unit 1, a storage unit 2, data input units (an image reading unit 3b and a communication unit 13), and an operation panel 4. In the following description, an image forming apparatus including the image processing apparatus 10 will be described. A multi-functional peripheral 100 will be described as the image forming apparatus. However, the respective elements such as the configuration and the arrangement described in this embodiment do not limit the scope of the disclosure and are only simple description examples.

Outline of Multi-Functional Peripheral 100

First, an outline of the multi-functional peripheral 100 according to the embodiment will be described using FIG. 1. FIG. 1 illustrates an exemplary multi-functional peripheral 100 according to the embodiment.

The multi-functional peripheral 100 includes the control unit 1 and the storage unit 2. The control unit 1 unifies an operation of the entire apparatus to control respective units of the multi-functional peripheral 100. The control unit 1 includes a CPU 11, which performs processes regarding calculation and control, and an image processing unit 12, which performs a process regarding image data. For example, the image processing unit 12 is an ASIC designed specifically for image processing. The image processing unit 12 performs image processing required for printing on the image data. The storage unit 2 includes storage devices such as a ROM, a RAM, and a HDD to store programs for control and various kinds of data.

The control unit 1 controls a document conveying unit 3a and the image reading unit 3b (equivalent to the data input unit). The control unit 1 causes the document conveying unit 3a to convey a set document toward a reading position. The control unit 1 causes the image reading unit 3b to read the document conveyed by the document conveying unit 3a and a document set on a platen (contact glass (not illustrated)) to generate image data. The control unit 1 controls the operation of the document conveying unit 3a and the image reading unit 3b.

The control unit 1 is connected to the operation panel 4. The operation panel 4 includes a display panel 41, a touch panel 42, and a hardware key 43. The control unit 1 controls display on the display panel 41. The control unit 1 displays information such as a setting screen, a state of the multi-functional peripheral 100, and a message on the display panel 41. The control unit 1 recognizes an operated operation image, among operation images such as a software key and a button displayed on the display panel 41, based on output of the touch panel 42. The control unit 1 recognizes the operated hardware key 43. Then, the control unit 1 causes the display panel 41 to switch to a screen corresponding to the operated operation image and hardware key 43. The control unit 1 recognizes a content of the setting operation performed on the operation panel 4 to control the multi-functional peripheral 100 so as to operate as setting.

The multi-functional peripheral 100 includes a printing unit 5. The printing unit 5 includes a paper sheet feeder 5a, a conveying unit 5b, an image forming section 5c, an intermediate transfer unit 5d, and a fixing unit 5e. The control unit 1 causes the paper sheet feeder 5a to supply the paper sheets one by one in a print job. The control unit 1 causes the conveying unit 5b to convey the paper sheet to a discharge tray (not illustrated) through the image forming section 5c and the fixing unit 5e. The control unit 1 causes the image forming section 5c to form a toner image put on the paper sheet conveyed by the conveying unit 5b. The control unit 1 causes the intermediate transfer unit 5d to receive a primary transfer of the toner image formed at the image forming section 5c, and then causes the intermediate transfer unit 5d to perform a secondary transfer to the paper sheet of the toner image. The control unit 1 causes the fixing unit 5e to heat and apply pressure on the paper sheet on which the toner image has been transferred. This fixes the toner image on the paper sheet. The conveying unit 5b discharges the printed paper sheet to the discharge tray.

The multi-functional peripheral 100 includes the communication unit 13 (equivalent to the data input unit). The communication unit 13 is an interface to communicate with a computer 200 such as a PC and a server. The communication unit 13 may be directly communicatively connected to the computer 200, for example, by a USB cable. The communication unit 13 receives data from the computer 200.

Color Printing at Image Forming Section 5c

Figure 2:
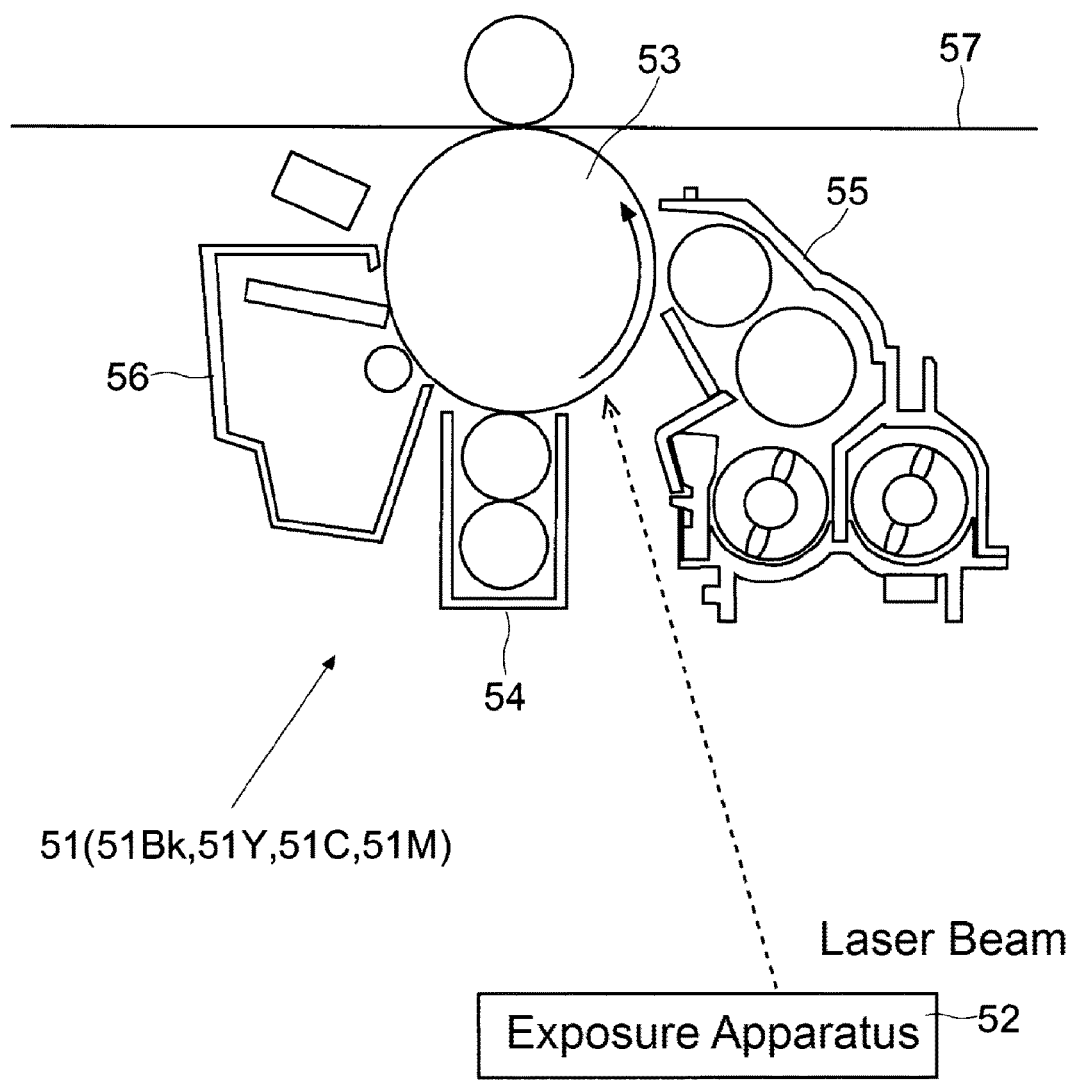
FIG. 2 illustrates one example of respective image forming units according to the embodiment.

The following describes exemplary color printing at the multi-functional peripheral 100 according to the embodiment, using FIGS. 1 and 2. FIG. 2 illustrates one example of respective image forming units 51 according to the embodiment.

The printing unit 5 can perform color printing. For the color printing, the image forming section 5c includes image forming units 51Bk (black), 51Y (yellow), 51C (cyan), and 51M (magenta) for four colors. The image forming section 5c also includes an exposure apparatus 52 (see FIG. 1). The respective image forming units 51Bk to 51M have each a similar configuration, although colors of formed toner images are different. Therefore, in the following, the image forming unit 51Bk for black will be described as an example. A similar description can apply to other image forming units 51. In the following description, signs: Bk, Y, C, and M that indicate the colors will be omitted except for a case especially described.

As illustrated in FIG. 2, each image forming unit 51 includes a photoreceptor drum 53, a charging apparatus 54, a developing device 55, and a cleaning apparatus 56. The photoreceptor drum 53 rotates at a predetermined peripheral velocity. The charging apparatus 54 charges a surface of the photoreceptor drum 53 at a constant electric potential. The exposure apparatus 52 performs a scanning exposure of the photoreceptor drum 53 after charging by an optical signal (laser beam, illustrated by a dashed line in FIG. 2) based on an image signal where color separation is performed on the image data. This forms an electrostatic latent image along with the image data on a circumference surface of the photoreceptor drum 53. Each developing device 55 houses a toner of the color: any of black, yellow, cyan, and magenta. The developing device 55 develops the electrostatic latent image of the corresponding photoreceptor drum 53 by the toner. The toner image generated by the development is primarily transferred on an intermediate transfer belt 57 of the intermediate transfer unit 5d. The intermediate transfer unit 5d secondarily transfers the toner image of the intermediate transfer belt 57 on the paper sheet. The cleaning apparatus 56 scrubs the surface of the photoreceptor drum 53 to remove residual toner.

Data for Job D1

Figure 3:
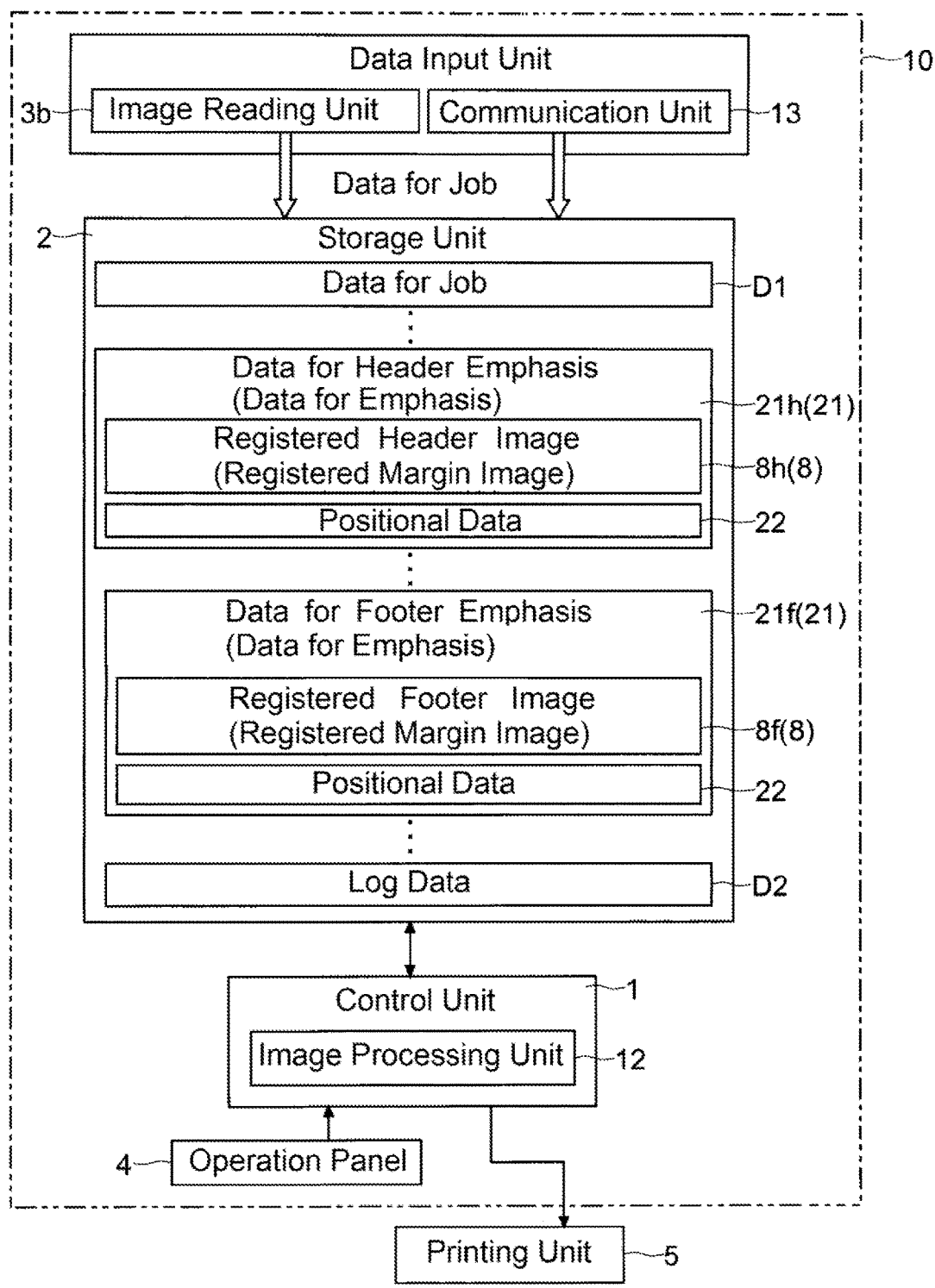
FIG. 3 illustrates a drawing to describe handling of data for job of the multi-functional peripheral according to the embodiment.

The following describes handling of data for job D1 at the multi-functional peripheral 100 according to the embodiment, using FIG. 3. FIG. 3 illustrates a drawing to describe the handling of the data for job D1 at the multi-functional peripheral 100 according to the embodiment.

The multi-functional peripheral 100 can execute a copy job, a transmitting job, a print job, a box print job, and similar job. The jobs accompanied by printing are the copy job, the print job, and the box print job. The copy job is a job that performs printing based on the image data generated such that the image reading unit 3b reads the document. The transmitting job is a job that performs transmission based on the image data generated such that the image reading unit 3b reads the document. The transmission destination is a facsimile device 300 (see FIG. 1) or the computer 200. The print job is a job that performs printing based on the data transmitted from the computer 200. The box print job is a job that performs printing based on the data stored in the storage unit 2. The data for job D1 is data used for these jobs.

In the copy job, the image data of the document generated such that the image reading unit 3b reads the document is the data for job D1. The control unit 1 causes the storage unit 2 to temporarily store the image data generated by the image reading unit 3b as the data for job D1. The image processing unit 12 performs image processing corresponding to the setting regarding the copy on the operation panel 4, on the image data. The image data after the image processing is transmitted to the exposure apparatus 52. The control unit 1 causes the printing unit 5 to execute the copy job (printing) based on the image data.

In the transmitting job, the image data of the document generated such that the image reading unit 3b reads the document is the data for job D1. The data that the communication unit 13 has received from the computer 200 may be the data for job D1. The control unit 1 causes the storage unit 2 to temporarily store the image data to be transmitted as the data for job D1. The image processing unit 12 performs image processing corresponding to the setting regarding the transmission on the operation panel 4, on the image data. The control unit 1 causes the communication unit 13 to transmit the image data after the image processing to the set destination.

In the print job, the data that the communication unit 13 has received from the computer 200 is the data for job D1. The communication unit 13 receives a file name (name) of a file instructed to be printed at the computer 200, data where a content of the file is described in a page description language, the image data, and data that indicates a set content set in printer driver software of the computer 200. The control unit 1 causes the storage unit 2 to store the data for job D1 received by the communication unit 13. The image processing unit 12 analyzes the data described in the page description language and the image data, generates the image data of each page based on an analysis result, and performs image processing corresponding to the setting performed at the computer 200, on the image data. The control unit 1 causes the printing unit 5 to execute the print job (printing) based on the image data.

In the box print job, the image data (box storing data) nonvolatilely stored in a box region located in the storage unit 2 is the data for job D1. The image data generated such that the image reading unit 3b reads the document and the image data received by the communication unit 13 are nonvolatilely stored in the box region of the storage unit 2 as the box storing data. The box print job can be a job that reuses the box storing data at any time one likes. The operation panel 4 accepts selection of the box storing data to be used. The image processing unit 12 performs image processing corresponding to the setting regarding the box print job on the operation panel 4, on the selected box storing data. The control unit 1 causes the printing unit 5 to execute the box print job (printing) based on the image data.

Thus, the image reading unit 3b and the communication unit 13 function as the data input units that input the data for job D1 used for the jobs such as the copy job, the transmitting job, the print job, and the box print job to the image processing apparatus 10 (the multi-functional peripheral 100). The printing unit 5 executes the instructed job based on the input data for job D1 (image data).

Automatic Emphasis Mode

Figure 4:
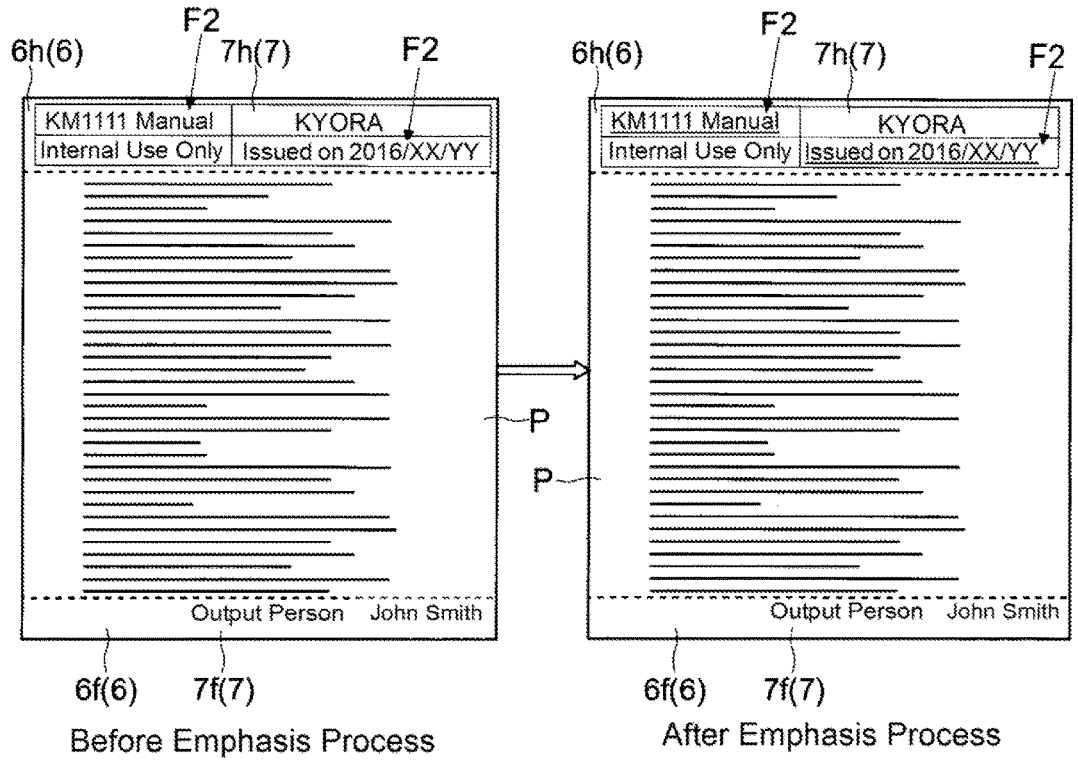
FIG. 4 illustrates an exemplary automatic emphasis mode according to the embodiment.

The following describes an outline of an automatic emphasis mode mounted on the multi-functional peripheral 100 according to the embodiment, using FIG. 4. FIG. 4 illustrates an exemplary automatic emphasis mode according to the embodiment.

On each page included in the job, margin regions 6 are sometimes located. The margin regions 6 are a header region 6h and a footer region 6f. The header region 6h is located between an upper end edge of a document and a first line of the page. For example, a belt-shaped (strip-shaped) region having a constant width at a lower side from the upper end edge of the document is treated as the header region 6h. The footer region 6f is located between a lower end edge of the document and a last line of the page. For example, a belt-shaped (strip-shaped) region having a constant width at an upper side of the page from the lower end edge of the document is treated as the footer region 6f. Usually, positions and widths of the header region 6h and the footer region 6f can be set in software used for documentation such as word processor software and a spreadsheet program.

Among the image data, an image in such margin region 6 is a margin image 7. The margin image 7 located in the margin region 6 includes information (character, numeral, mark, and symbol) such as a company name, a document title, a version of the document, and a creation date. The margin image 7 sometimes includes characters that indicate that the document is a classified document and a figure such as a company mark. An image (margin image 7) in the header region 6h is a header image 7h. An image (margin image 7) in the footer region 6f is a footer image 7f. Usually, a user performs an operation that inserts information into the margin region 6 on the software used for the documentation.

Then, at the multi-functional peripheral 100, performing a predetermined operation on the operation panel 4 can configure the multi-functional peripheral 100 to the automatic emphasis mode. In other words, the operation panel 4 accepts the setting that executes the job in the automatic emphasis mode.

For the process in the automatic emphasis mode, data for emphasis 21 is preliminarily registered in the storage unit 2 (see FIGS. 1 and 3). The data for emphasis 21 includes the margin image 7 that has been registered (a registered margin image 8) and positional data 22 that indicates a position of an emphasis region F1 among the registered margin image 8 (see FIG. 3). Then, when the job is executed in the automatic emphasis mode, the control unit 1 (the image processing unit 12) determines a page (a matching page) including the margin region 6 (the margin image 7) identical or similar to the registered margin image 8, among page image data P, which is the image data of the page based on the data for job D1. Subsequently, the control unit 1 performs the image processing on the matched page image data P. Specifically, the control unit 1 performs the image processing that emphasizes a region (a corresponding region F2) including information similar to that of the emphasis region F1 set in the registered margin image 8 among the matched page image data P.

FIG. 4 illustrates an exemplary page where the header image 7h including four frames is located on the header region 6h. In the header image 7h in FIG. 4, "KM1111 Manual" that indicates a document title is located in an upper-left frame, "KYORA" that indicates a company name is located in an upper-right frame, "Internal Use Only" that indicates a security level is located in a bottom-left frame, and "Issued on 2016/XX/YY" that indicates a date of issue is located in a bottom-right frame. An image identical or similar to this header image 7h is preliminarily registered as a registered header image 8h.

A drawing on the left side in FIG. 4 illustrates an exemplary state before emphasizing. A drawing on the right side in FIG. 4 illustrates an exemplary result that the job has been executed in the automatic emphasis mode. The drawing on the right side in FIG. 4 illustrates an example where, as the result of the execution of the job in the automatic emphasis mode, an emphasis that attaches underlines to a part of "KM1111 Manual" and a part of the numerals and the symbols in "Issued on 2016/XX/YY," among the header image 7h. A color of the underline is not limited to black. The color used for emphasizing may change per print job.

Registration of Data for Emphasis 21

Figure 5:
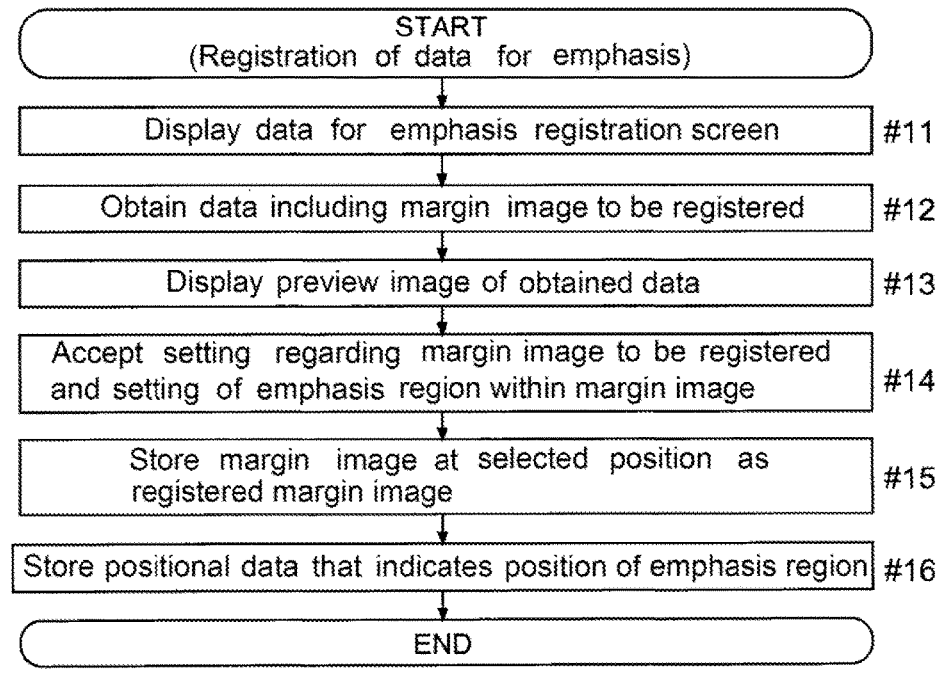
FIG. 5 illustrates an exemplary registration flow of data for emphasis at the multi-functional peripheral according to the embodiment.
Figure 6:
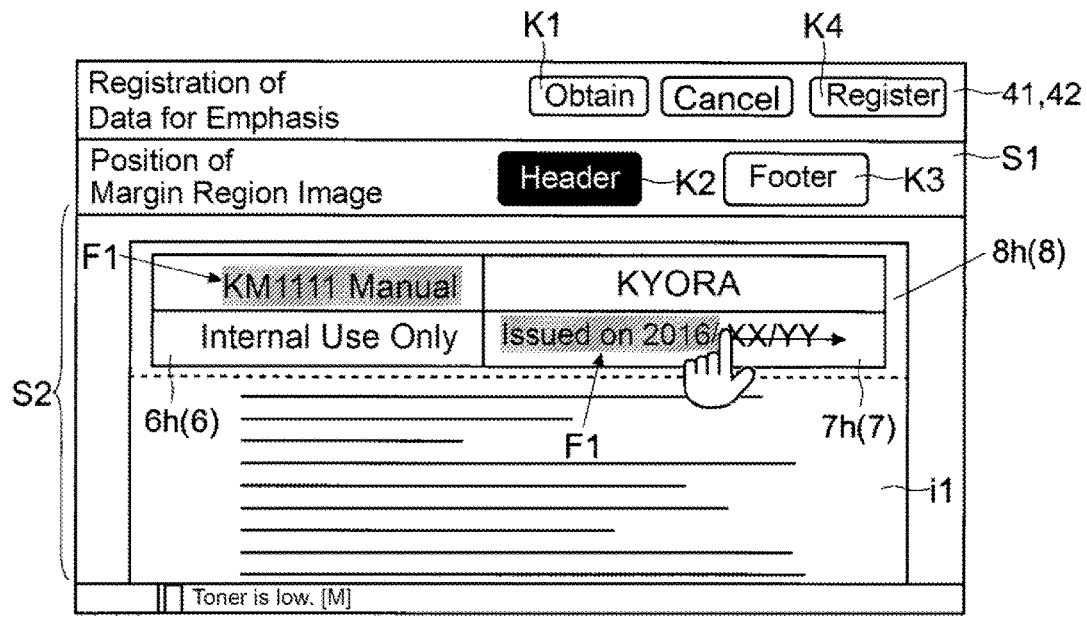
FIG. 6 illustrates exemplary data for emphasis registration screen according to the embodiment.

The following describes an exemplary registration flow of the data for emphasis 21 at the multi-functional peripheral 100 according to the embodiment, using FIGS. 5 and 6. FIG. 5 illustrates an exemplary registration flow of the data for emphasis 21 at the multi-functional peripheral 100 according to the embodiment. FIG. 6 illustrates exemplary data for emphasis registration screen 51 according to the embodiment.

FIG. 5 starts at the point when a predetermined operation for registering the data for emphasis 21 is performed on the operation panel 4 (the touch panel 42 and the hardware key 43). When this operation is performed, the control unit 1 displays the data for emphasis registration screen 51 on the display panel 41 (Step #11). As illustrated in FIG. 5, on the data for emphasis registration screen 51, an obtain key K1, a header key K2, a footer key K3, a register key K4, and an emphasis region setting screen S2 are located.

The data including the margin image 7 to be registered is obtained (Step #12). When the data is obtained, the obtain key K1 is operated. For example, the data is obtained by scanning. In this case, the printed matter on which the margin image 7 to be registered is printed is prepared. The image reading unit 3b reads the printed matter to obtain the image data of the printed matter including the margin image 7. The data including the margin image 7 may be obtained based on the data transmitted from the computer 200.

Then, the control unit 1 displays a preview image i1 of the obtained data (image data) on the emphasis region setting screen S2 (Step #13). FIG. 6 illustrates an exemplary preview image i1 of the obtained data. The operation panel 4 accepts the setting (position and size) regarding the margin image 7 to be registered and the setting of the region (emphasis region F1) that the user likes to emphasize within the margin image 7 to be registered (Step #14).

The user can select whether the margin image 7 to be registered by operating the header key K2 and the footer key K3 is the header image 7h or the footer image 7f. When the margin image 7 to be registered is the header image 7h, the header key K2 is operated. When the margin image 7 to be registered is the footer image 7f, the footer key K3 is operated. FIG. 6 illustrates an exemplary state where the header key K2 is operated. The control unit 1 recognizes the position (the header or the footer) of the margin image 7 to be registered, based on the operated key.

The user can set the size of the margin image 7 to be registered, on the operation panel 4. In FIG. 6, the user can drag a dashed line that extends in a lateral direction located on the preview image i1 to set the size (range) of the margin image 7 by moving the dashed line up and down. In the case of the header image 7h, the control unit 1 causes the storage unit 2 to store the image data in a range from the upper end edge of the page to the dashed line, as the registered margin image 8 (the registered header image 8h). In the case of the footer image 7f, the control unit 1 causes the storage unit 2 to store the image data in a range from the lower end edge of the page to the dashed line, as the registered margin image 8 (a registered footer image 8f).

The operation panel 4 may accept a numerical value input that specifies the size of the margin image 7 on an on-screen keyboard and the hardware key 43. In this case, the control unit 1 recognizes the size of the margin image 7 based on the input numerical value.

The user can set the emphasis region F1 on the operation panel 4. For example, the emphasis region F1 may be settable by an operation that traces a part that the user likes to emphasize, among the margin image 7 included in the preview image i1. In this case, the control unit 1 recognizes a region having a constant width centering a locus from a touched position to a position where a finger of the touch separates as the emphasis region F1, based on an output of the touch panel 42. For example, tracing to right and left specifies the emphasis region F1 in a belt shape in the lateral direction. FIG. 6 illustrates the set emphasis region F1 by half-tone dot meshing. FIG. 6 illustrates a state where the part of "KM1111 Manual" is set to the emphasis region F1, and further, the user tries to trace the part of "Issued on 2016/XX/YY" from a left edge to a right edge.

The emphasis region F1 may be settable by an operation that encloses the part that the user likes to emphasize. In this case, the control unit 1 recognizes a region within the locus from the touched position to the position where the finger of the touch separates as the emphasis region F1, based on the output of the touch panel 42.

Such that the size of the margin image 7 and the range of the emphasis region F1 can be set in detail, the preview image i1 can be enlarged or decreased. When an operation that instructs to enlarge the preview image i1 such as a pinch-out operation is performed on the touch panel 42, or when an operation that instructs to decrease the preview image i1 such as a pinch-in operation is performed on the touch panel 42, the control unit 1 (the image data) generates new image data for preview having a magnification corresponding to the instruction based on the obtained data to display the preview image i1 based on the generated image data for preview on the emphasis region setting screen S2. Keys to enlarge or decrease the preview image i1 such as an enlarge key and a decrease key may be additionally located. A flick operation can move a position displayed on the emphasis region setting screen S2 among the preview image i1. A scroll bar may be additionally located to move the displayed position.

When a predetermined cancel operation is performed, the control unit 1 may release the emphasis region F1 where the cancel operation is performed. It is possible to determine as necessary that what kind of operation the cancel operation is. For example, the control unit 1 may recognize second-consecutive touches in the region of the set emphasis region F1 as the cancel operation.

When the setting is completed, the user operates the register key K4. When the register key K4 is operated, the control unit 1 causes the storage unit 2 to nonvolatilely store the image data in the set range and the margin image 7 at the set position (the header or the footer) among the obtained image data as the registered margin image 8 (Step #15, see FIG. 3). The control unit 1 causes the storage unit 2 to nonvolatilely store the positional data 22 that indicates the position of the set emphasis region F1 among the margin image 7, in relation to the margin image 7 (Step #16, see FIG. 3). This completes (ends) the registration of the data for emphasis 21 including the margin image 7 and the positional data 22.

In this description, the margin image 7 that has been registered is referred to as the registered margin image 8. The header image 7h registered such that the header key K2 is operated is referred to as the registered header image 8h. The data for emphasis 21 including the registered header image 8*h* and the positional data 22 that indicates the position of the emphasis region F1 specified in the registered header image 8*h* is referred to as data for header emphasis 21*h*. The footer image 7*f* registered such that the footer key K3 is operated is referred to as the registered footer image 8*f*. The data for emphasis 21 including the registered footer image 8*f* and the positional data 22 that indicates the position of the emphasis region F1 specified in the registered footer image 8*f* is referred to as data for footer emphasis 21*f* (see FIG. 3).

Job Process Flow in Automatic Emphasis Mode

Figure 7:
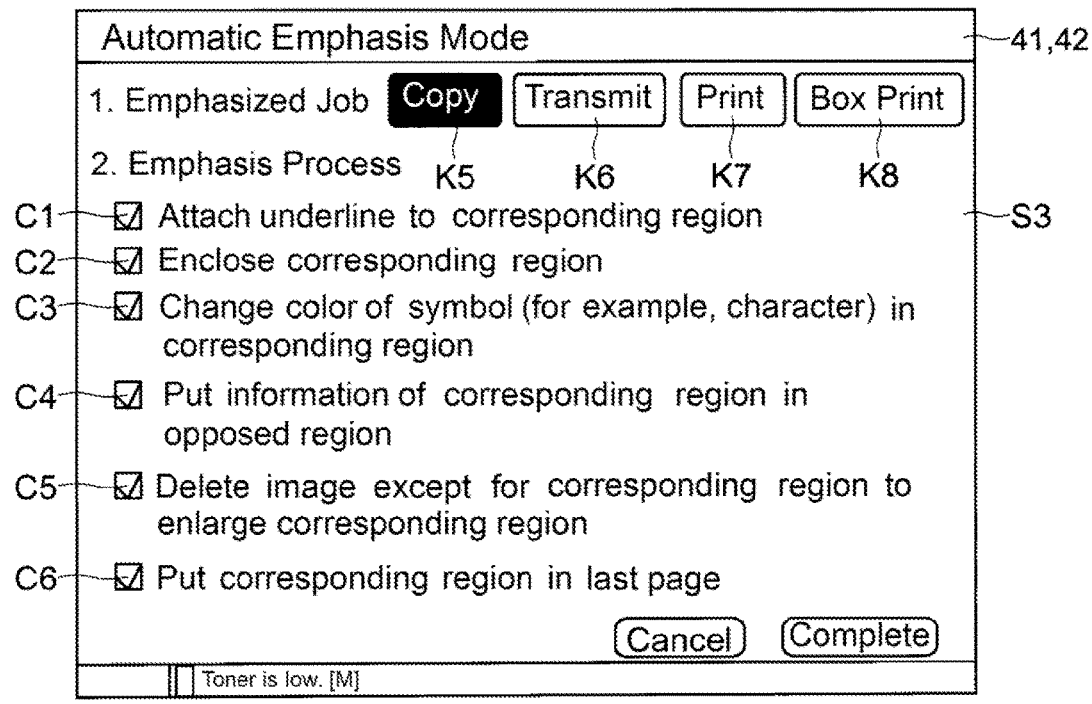
FIG. 7 illustrates an exemplary emphasis process setting screen according to the embodiment.
Figure 8:
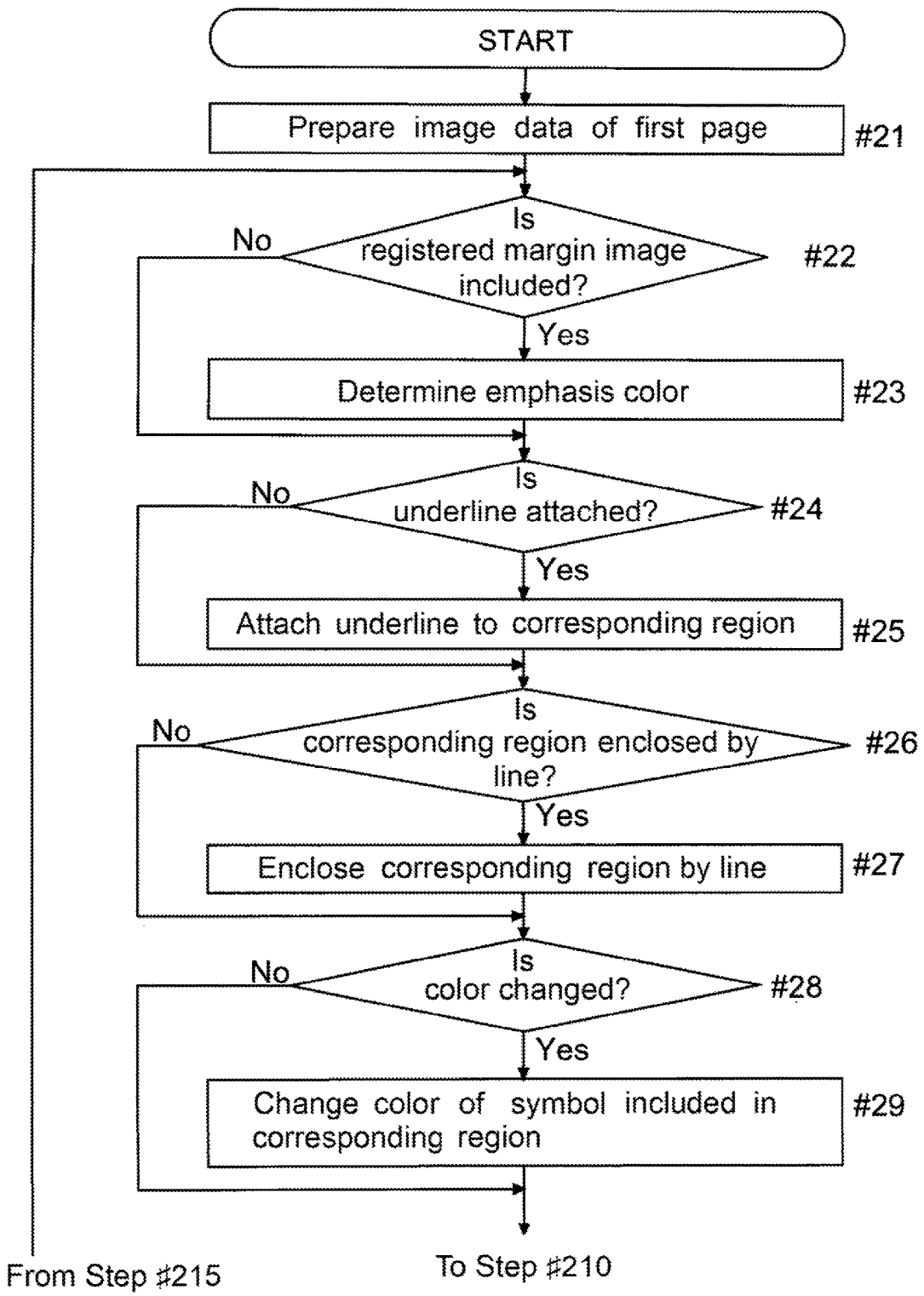
FIG. 8 illustrates an exemplary job process flow in the automatic emphasis mode according to the embodiment.
Figure 9:
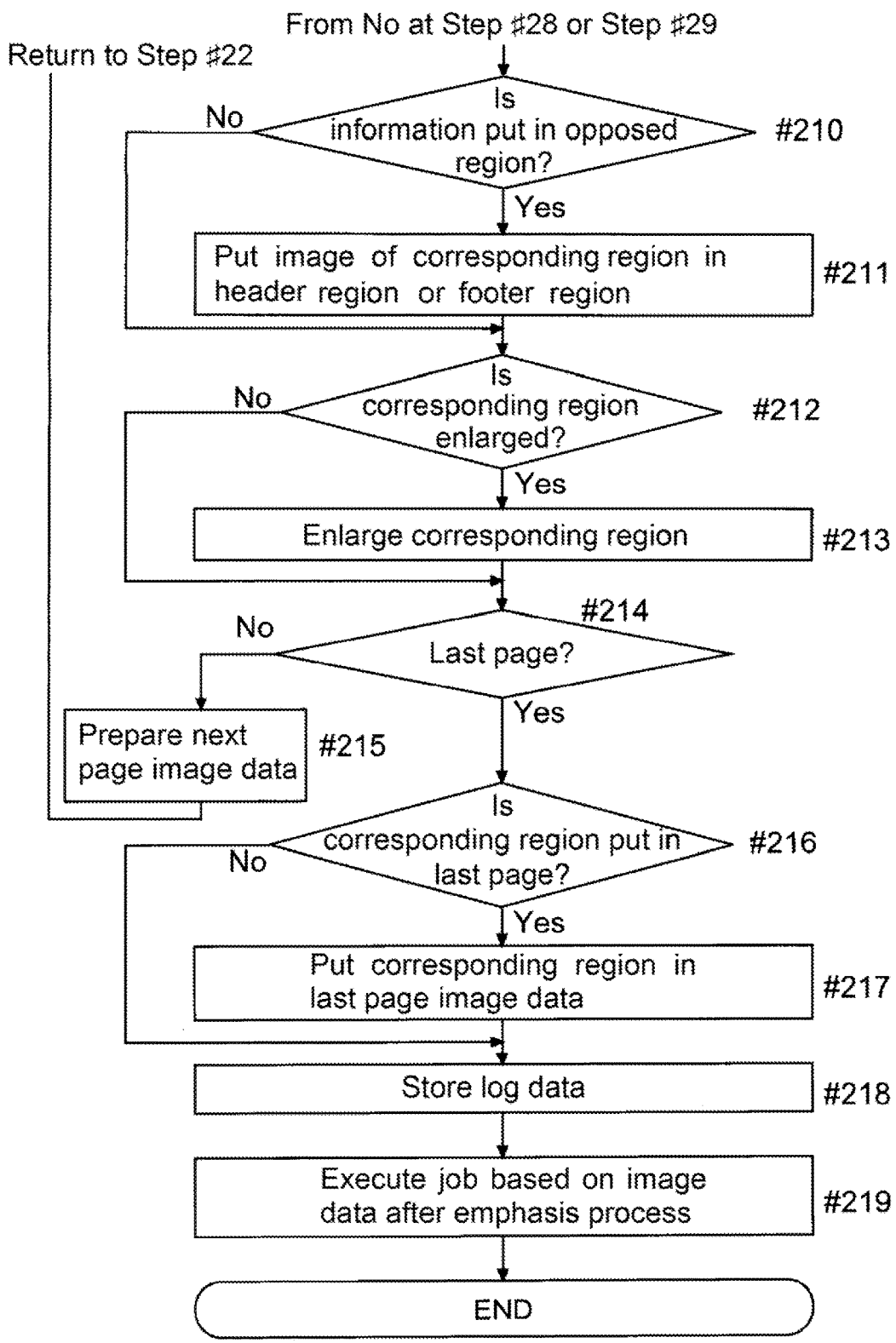
FIG. 9 illustrates an exemplary job process flow in the automatic emphasis mode according to the embodiment.
Figure 10:
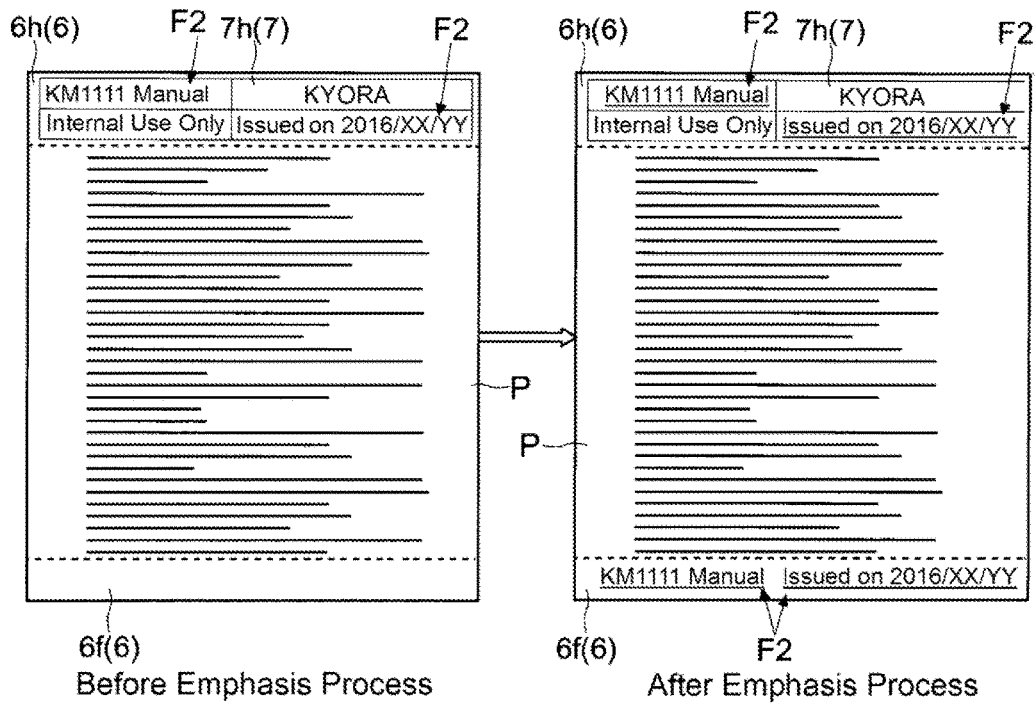
FIG. 10 illustrates an exemplary emphasis process according to the embodiment.
Figure 11:
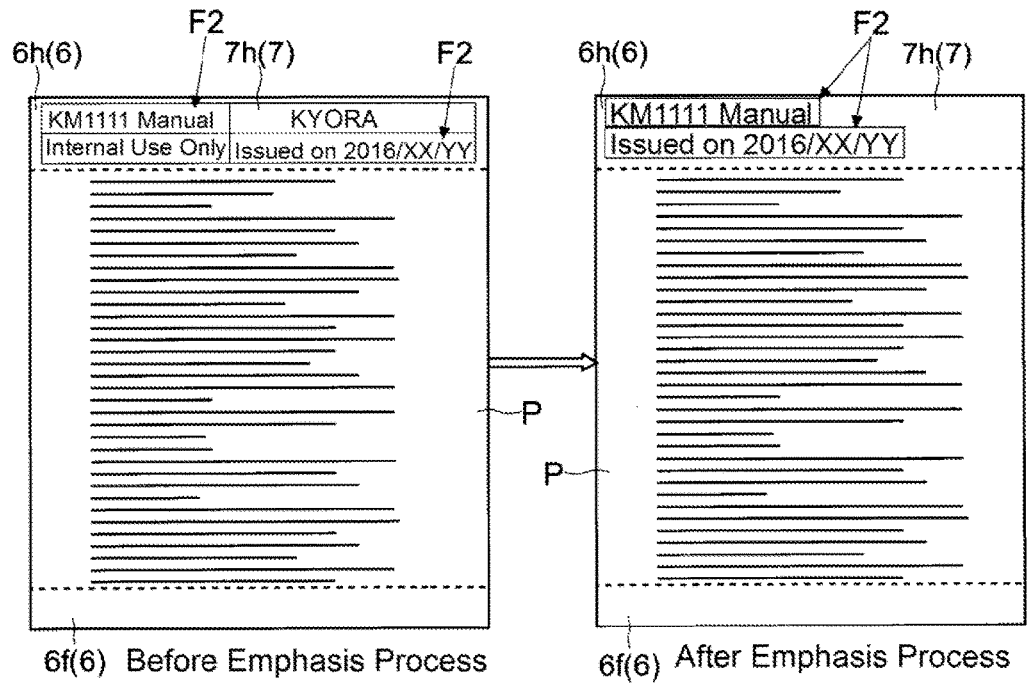
FIG. 11 illustrates an exemplary emphasis process according to the embodiment.
Figure 12:
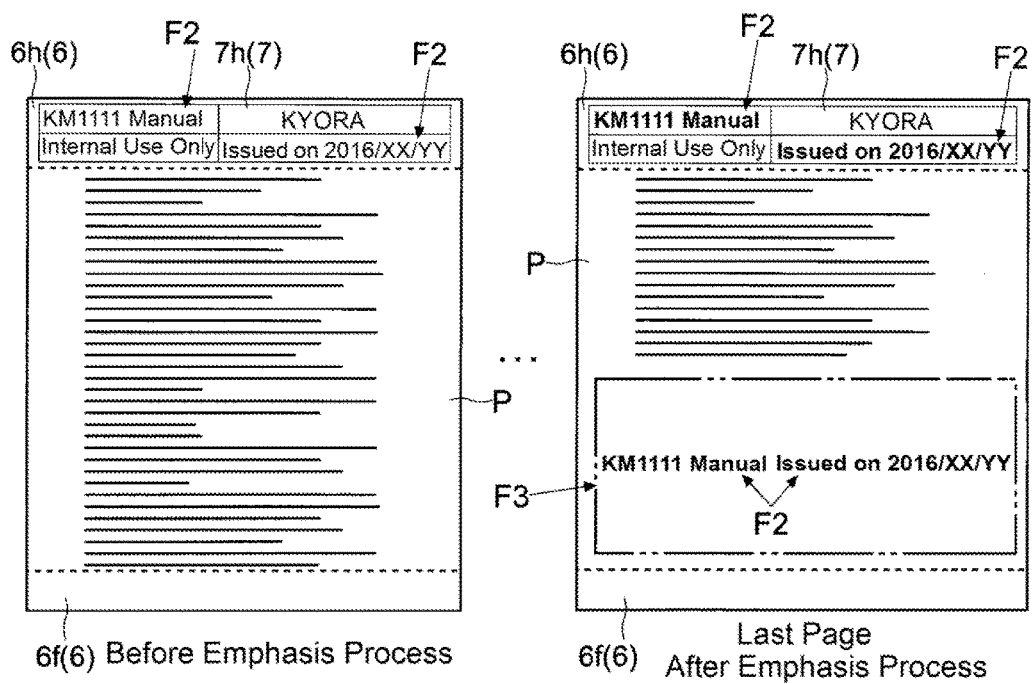
FIG. 12 illustrates an exemplary emphasis process according to the embodiment.

The following describes an exemplary job process flow in the automatic emphasis mode according to the embodiment based on FIGS. 7 to 12. FIG. 7 illustrates an exemplary emphasis process setting screen S3 according to the embodiment. FIGS. 8 and 9 illustrate an exemplary job process flow in the automatic emphasis mode according to the embodiment. FIGS. 10 to 12 illustrate an exemplary emphasis process according to the embodiment.

FIG. 7 illustrates an exemplary emphasis process setting screen S3 to perform the setting regarding the emphasis process in the automatic emphasis mode. When a predetermined operation to open the emphasis process setting screen S3 is performed on the operation panel 4, the control unit 1 displays the emphasis process setting screen S3 on the display panel 41.

The multi-functional peripheral 100 can execute the copy job, the transmitting job, the print job, and the box print job. These jobs can be executed in the automatic emphasis mode. On the emphasis process setting screen S3, it is possible to configure to which job the automatic emphasis mode is applied. In other words, the operation panel 4 accepts the selection of the job that performs the emphasis process on the corresponding region F2.

On the emphasis process setting screen S3, a copy job key K5, a transmitting job key K6, a print job key K7, and a box print job key K8 are located. The user operates the key corresponding to the job to which the user likes to apply the automatic emphasis mode. The control unit 1 displays the key (job) in a selected state in a black-and-white inversion state. Touching the key in the black-and-white inversion state can release the selected state to also release the selected state of the job. FIG. 7 illustrates a state where the copy job key K5 is operated, and the setting that applies the automatic emphasis mode to the copy job is performed.

On the emphasis process setting screen S3, a first check box C1, a second check box C2, a third check box C3, a fourth check box C4, a fifth check box C5, and a sixth check box C6 are located. The respective check boxes are check boxes to determine contents of the emphasis process.

The following describes an exemplary job process flow in the automatic emphasis mode using FIG. 8. FIG. 8 starts at the point when the execution of the job to which the automatic emphasis mode is applied starts.

First, the control unit 1 prepares image data (page image data P) of a first page, based on the input data for job D1 (Step #21). Then, the control unit 1 determines whether the registered margin image 8 is included in the margin region 6 (the header region 6*h* or the footer region 6*f*) of the prepared page image data P or not (Step #22). The control unit 1 matches the registered header image 8*h* included in the data for header emphasis 21*h* and the header region 6*h* of the page image data P, and matches the registered footer image 8*f* included in the data for footer emphasis 21*f* and the footer region 6*f* of the page image data P, among the respective registered margin images 8 stored in the storage unit 2.

Specifically, the control unit 1 compares the registered header image 8*h* (the registered margin image 8) with the header region 6*h* (the header image 7*h*) of the page image data P. When a degree of similarity is equal to or more than a similarity reference value, the control unit 1 determines that the registered header image 8*h* is included in the page. When a plurality pieces of data for header emphasis 21*h* are stored, the control unit 1 compares the plurality pieces of data for header emphasis 21*h* with the respective registered header images 8*h*. The control unit 1 compares the registered footer image 8*f* (the registered margin image 8) with the footer region 6*f* (the footer image 7*f*) of the page image data P. When a degree of similarity is equal to or more than a similarity reference value, the control unit 1 determines that the registered footer image 8*f* is included in the page. When a plurality pieces of data for footer emphasis 21*f* are stored, the control unit 1 compares the plurality pieces of data for footer emphasis 21*f* with the respective registered footer images 8*f*.

Further, the control unit 1 may determine whether the registered margin image 8 is included in the page image data P or not, based on an OCR process. The control unit 1 performs the OCR process on each of the registered header image 8*h* and the header image 7*h* of the page image data P to obtain a text. When a degree of coincidence of the obtained text is equal to or more than a coincidence reference value, the control unit 1 determines that the registered header image 8*h* is included in the page. When a plurality pieces of data for header emphasis 21*h* are stored, the control unit 1 obtains the texts of the respective registered header images 8*h*. The control unit 1 performs the OCR process on each of the registered footer image 8*f* (the registered margin image 8) and the footer image 7*f* of the page image data P to obtain the text. When a degree of coincidence of the obtained text is equal to or more than the coincidence reference value, the control unit 1 determines the registered footer image 8*f* is included in the page. When a plurality pieces of data for footer emphasis 21*f* are stored, the control unit 1 obtains the texts of the respective registered footer images 8*f*.

When the registered margin image 8 is included (Yes at Step #22), the control unit 1 determines a color used for emphasis (hereinafter referred to as an emphasis color) (Step #23). The control unit 1 performs the emphasis process on the respective page image data P based on the data for job D1 of the job to be executed from now, with an identical emphasis color. Therefore, when the emphasis color has already been determined in the job (when the flow returns to Step #23 by loop), Step #23 is skipped.

At the image processing apparatus 10 (the multi-functional peripheral 100), a plurality of emphasis colors are preliminarily determined. The emphasis color is switched in a predetermined order in units of jobs. This can switch the emphasis color in units of jobs. However, the colors that can be used are limited. Thus, the emphasis colors used in different jobs including the identical registered margin image 8 may be identical.

Therefore, when the job is executed in the automatic emphasis mode, and the emphasis process is performed, the control unit 1 causes the storage unit 2 to store a combination of the data that indicates the registered margin image 8 included in the image in the page of the job and the color used for the emphasis process, as log data D2 (see Step #218 described below). Then, the control unit 1 confirms whether the spent registered margin image 8 that has previously been determined to be included in the page image data P is included in the page image data P of the job to be executed from now or not. When the spent registered margin image 8 is included, the control unit 1 at least differentiates the emphasis color in this time from the emphasis color of the last job including the spent registered margin image 8. The emphasis color may be an identical color in all the jobs. For example, red or black may be fixedly used as the emphasis color. In this case, Step #23 may be skipped.

After the emphasis color is determined, the control unit 1 confirms whether an underline should be attached to the corresponding region F2 or not (Step #24). In other words, the control unit 1 confirms whether the first check box C1 on the emphasis process setting screen S3 is checked or not. When the emphasis process that attaches the underline to the corresponding region F2 is selected (Yes at Step #24), the control unit 1 performs the emphasis process that attaches the underline with the emphasis color on a region whose position is identical to the position of the emphasis region F1 of the included registered margin image 8, among the page image data P (Step #25). Hereinafter, the region whose position is identical to the position of the emphasis region F1 of the included registered margin image 8, among the page image data P is referred to as the corresponding region F2.

Specifically, when the registered header image 8h is included in the page image data P, the control unit 1 attaches the underline to the corresponding region F2, among the header region 6h in the page image data P. When the registered footer image 8f is included in the page image data P, the control unit 1 attaches the underline to the corresponding region F2, among the footer region 6f in the page image data P. Consequently, the underline is attached to the information that the use likes to emphasize.

In the case of No at Step #24, or after Step #25, the control unit 1 confirms whether the corresponding region F2 should be enclosed by a line or not (Step #26). In other words, the control unit 1 confirms whether the second check box C2 on the emphasis process setting screen S3 is checked or not.

When the emphasis process that encloses the corresponding region F2 by the line is selected (Yes at Step #26), the control unit 1 performs the emphasis process that encloses the corresponding region F2 among the page image data P by the line with the emphasis color (Step #27). The underline and the enclosing line may overlap one another. Specifically, when the registered header image 8h is included in the page image data P, the control unit 1 encloses the corresponding region F2 among the header region 6h in the page image data P by the line. When the registered footer image 8f is included in the page image data P, the control unit 1 encloses the corresponding region F2 among the footer region 6f in the page image data P by the line. Consequently, the information that the use likes to emphasize is enclosed by the line.

In the case of No at Step #26, or after Step #27, the control unit 1 subsequently confirms whether the color of the symbol (the character, the numeral, and the mark) included in the corresponding region F2 should be changed or not (Step #28). In other words, the control unit 1 confirms whether the third check box C3 on the emphasis process setting screen S3 is checked or not. When the emphasis process that changes the color of the symbol (the character, the numeral, and the mark) included in the corresponding region F2 is selected (Yes at Step #28), the control unit 1 performs the emphasis process that changes the color of the symbol included in the corresponding region F2 among the page image data P to the emphasis color (Step #29).

Specifically, when the registered header image 8h is included in the page image data P, the control unit 1 changes pixel values of dark pixels that are equal to or darker than a certain pixel included in the corresponding region F2 (a pixel of a part except for a ground, such as a symbol part) among the header region 6h in the page image data P to a pixel value with the emphasis color. When the registered footer image 8f is included in the page image data P, the control unit 1 changes pixel values of dark pixels that are equal to or darker than a certain pixel included in the corresponding region F2 (pixels having pixel values that have higher densities than those of the ground by a certain extent) among the footer region 6f in the page image data P to the pixel value with the emphasis color. Consequently, the information that the use likes to emphasize is transformed to a color such as red or blue.

In the case of No at Step #28, or after Step #29, the control unit 1 confirms whether the information is put in a region opposed to the corresponding region F2 or not (Step #210). In other words, the control unit 1 confirms whether the fourth check box C4 on the emphasis process setting screen S3 is checked or not.

When the selection that puts the information in the region opposed to the corresponding region F2 is performed (Yes at Step #210), the control unit 1 performs the emphasis process that puts the image of the corresponding region F2 of the header region 6h in the footer region 6f, or puts the image of the corresponding region F2 of the footer region 6f in the header region 6h, among the page image data P (Step #211).

Specifically, when the registered header image 8h is included in the page image data P, the control unit 1 copies the image of the corresponding region F2 among the header region 6h in the page image data P to include the copied image in the footer region 6f (a region opposed to the header region 6h). When the registered footer image 8f is included in the page image data P, the control unit 1 copies the image of the corresponding region F2 among the footer region 6f in the page image data P to include the copied image in the header region 6h (a region opposed to the header region 6h). Consequently, the information that the use likes to emphasize is automatically added to the header region 6h and the footer region 6f.

FIG. 10 illustrates an exemplary case that has determined that the registered header image 8h is included in the page image data P. FIG. 10 illustrates an example that performs the emphasis process that attaches the underline to the image of the region (the corresponding region F2) whose position is identical to the position of the emphasis region F1 determined in the data for header emphasis 21h, among the header region 6h in the page image data P. FIG. 10 illustrates an example that attaches the underlines to the images of the corresponding region F2 including a symbol string "KM1111 Manual" and the corresponding region F2 including a symbol string "Issued on 2016/XX/YY."

Further, FIG. 10 illustrates an example where the control unit 1 copies the images of the corresponding regions F2 (the region including the symbol string "KM1111 Manual" and the region including the symbol string "Issued on 2016/XX/YY"), among the header region 6h in the page image data P, to attach the copied images to the footer region 6f (the region opposed to the header region 6h) such that the copied images do not overlap one another.

In the case of No at Step #210, or after Step #211, the control unit 1 confirms whether the corresponding region F2 should be enlarged or not (Step #212). In other words, the control unit 1 confirms whether the fifth check box C5 on the emphasis process setting screen S3 is checked or not. When the selection that enlarges the corresponding region F2 is performed (Yes at Step #212), the control unit 1 performs the emphasis process that enlarges the corresponding region F2 (Step #213).

Specifically, when the registered header image 8h is included in the page image data P, the control unit 1 deletes the image except for the corresponding region F2 (transforms to a ground color), among the header region 6h in the page image data P. When the registered footer image 8f is included in the page image data P, the control unit 1 deletes the image except for the corresponding region F2 (transforms to the ground color), among the footer region 6f in the page image data P. The ground color may be determined as necessary. For example, the control unit 1 confirms the pixel values of the respective pixels of the header region 6h and the footer region 6f in the page image data P to determine the pixel value whose frequency is maximum as the ground color.

Furthermore, when the registered header image 8h is included in the page image data P, the control unit 1 enlarges the image of the corresponding region F2, among the header region 6h in the page image data P. When the registered footer image 8f is included in the page image data P, the control unit 1 enlarges the image of the corresponding region F2, among the footer region 6f in the page image data P. The control unit 1 enlarges the image of the corresponding region F2 without protruding the corresponding region F2 from the header region 6h and the footer region 6f.

FIG. 11 illustrates an exemplary case that has determined that the registered header image 8h is included in the page image data P. FIG. 11 illustrates an example that performs the emphasis process that attaches the enclosing line with the emphasis color to the image of the corresponding region F2, among the header region 6h in the page image data P. Further, FIG. 11 illustrates an example where the control unit 1 deletes the images except for the images of the corresponding regions F2 (the region including the symbol string "KM1111 Manual" and the region including the symbol string "Issued on 2016/XX/YY"), among the header region 6h in the page image data P to enlarge the images of the corresponding regions F2 without protruding the corresponding regions F2 from the header region 6h. FIG. 11 illustrates an exemplary case that stacks the enlarged respective corresponding regions F2 in a vertical direction to left-justify the respective corresponding regions F2.

Then, the control unit 1 confirms whether a page in currently processing is a last page of the job or not (Step #214). When the page is not the last page (No at Step #214), the control unit 1 prepares next page image data P based on the input data for job D1 (Step #215). Then, the flow returns to Step #22.

When the page is last page (Yes at Step #214), the control unit 1 confirms whether the corresponding region F2 is put in the last page or not (Step #216). In other words, the control unit 1 confirms whether the sixth check box C6 on the emphasis process setting screen S3 is checked or not.

When the selection that puts the corresponding region F2 in the last page is performed (Yes at Step #216), the control unit 1 performs the emphasis process that puts the corresponding region F2 in the last page image data P (Step #217).

Specifically, when the registered header image 8h is included in any of the page image data P, the control unit 1 extracts the image of the corresponding region F2 in its page. When the registered footer image 8f is included in any of the page image data P, the control unit 1 extracts the image of the corresponding region F2 in its page. Then, the control unit 1 attaches the extracted image to a blank region F3 having an area equal to or more than a certain area included in the region except for the header region 6h and the footer region 6f (a region where a body text is described), among the last page.

The control unit 1 searches the blank region F3 that has the area equal to or more than the certain area and whose number of the pixels with pixel values in densities equal to or more than a certain pixel is smaller than a threshold value, among the region except for the header region 6h and the footer region 6f in the last page image data P. When there is no blank region F3 having the area equal to or more than the certain area, the control unit 1 does not overwrite on the body text and does not attach the extracted image. Only when there is the blank region F3 having the area equal to or more than the certain area, the control unit 1 attaches the extracted image.

FIG. 12 illustrates an exemplary case that has determined that the registered header image 8h is included in the page image data P. In FIG. 12, the characters, the numerals, and the symbols in the image of the corresponding region F2, among the header region 6h in the page image data P are changed to the emphasis color. Further, FIG. 12 illustrates an example where the control unit 1 extracts the images of the corresponding regions F2 (the region including the symbol string "KM1111 Manual" and the region including the symbol string "Issued on 2016/XX/YY"), among the header region 6h in the page image data P to attach the image to the blank region F3 in the last page image data P.

Then, when the emphasis process is performed in the job, the control unit 1 causes the storage unit 2 to store the combination of the data that indicates the registered margin image 8 included in the image in the page of the job and the color used for the emphasis process, as the log data D2 (Step #218). The control unit 1 executes the job based on the image data after the emphasis process (Step #219). In the cases of the copy job, the print job, and the box print job, the control unit 1 causes the printing unit 5 to execute the print job based on the image data after the emphasis process. In the case of the transmitting job, the control unit 1 causes the communication unit 13 to transmit the image data after the emphasis process to the set address.

Thus, the image processing apparatus 10 according to the embodiment includes the data input units (the image reading unit 3b and the communication unit 13), the operation panel 4, the storage unit 2, and the control unit 1. The data input unit receives the input of the data for job D1 used for the job. The operation panel 4 accepts the registration of the margin image 7 located on the margin region 6 preliminarily determined within the document among the page and the setting of the emphasis region F1 within the margin image 7. The storage unit 2 stores the data for emphasis 21 including the registered margin image 8, which is the margin image 7 that has been registered, and the positional data 22 that indicates the position of the emphasis region F1 in the registered margin image 8. The control unit 1 determines whether the registered margin image 8 is included in the page image data P, which is the image data of the page based on the data for job D1, or not. When the control unit 1 determines that the registered margin image 8 is included in the page image data P, the control unit 1 performs the emphasis process on the image of the corresponding region F2 whose position at the registered margin image 8 included in the page image data P is identical to the position of the emphasis region F1 in the stored registered margin image 8 included in the data for emphasis 21, among the page image data P.

This can provide the image processing apparatus 10 that automatically performs the emphasis process to the region including the information similar to that of the emphasis region F1, among the page including the margin image 7 similar to the registered margin image 8, only by registering the margin image 7 and the emphasis region F1 within this margin image 7. Therefore, parts of important information such as the document title and the version of the document can be eye-catching. Thus, it facilitates the understanding of what kind of document it is. It eliminates the need for editing original data of the document. For example, even if there are a plurality of files (a plurality pieces of data) of the identical margin image 7, it eliminates the need for editing the respective files regarding the emphasis.

The margin image 7 is the header image 7h or the footer image 7f. The storage unit 2 stores the data for header emphasis 21h including the registered header image 8h, which is the header image 7h registered as the registered margin image 8, and the positional data 22, as the data for emphasis 21. The storage unit 2 stores the data for footer emphasis 21f including the registered header image 8h, which is the footer image 7f registered as the registered margin image 8, and the positional data 22, as the data for emphasis 21. This can emphasize the region (the corresponding region F2) including the information similar to that of the emphasis region F1, in the job including the header image 7h and the footer image 7f similar to the registered header image 7h and footer image 7f.

When the registered header image 8h is included in the page image data P, the control unit 1 puts the image of the corresponding region F2 in the footer region 6f in the page image data P. When the registered footer image 8f is included in the page image data P, the control unit 1 puts the image of the corresponding region F2 in the header region 6h in the page image data P. This writes the corresponding region F2 of the header region 6h in the footer region 6f, and the corresponding region F2 of the footer region 6f in the header region 6h. Thus, the important information is described in both of the header region 6h and the footer region 6f. Therefore, the information included in the emphasis region F1 (the corresponding region F2) can be more emphasized.

When the registered header image 8h is included in the page image data P, the control unit 1 deletes the part except for the corresponding region F2 among the header region 6h in the page image data P, and locates the image where the corresponding region F2 has been enlarged on the header region 6h. When the registered footer image 8f is included in the page image data P, the control unit 1 deletes the part except for the corresponding region F2 among the footer region 6f in the page image data P, and locates the image where the corresponding region F2 has been enlarged on the footer region 6f. This enlarges the corresponding region F2 within the page image data P to ensure emphasizing only the information included in the corresponding region F2 (the emphasis region F1) such as the document title and the version information. Therefore, the important information included in the corresponding region F2 can be easily understood.

The control unit 1 puts the image of the corresponding region F2 of any page included in the job, in the blank region F3 within the page image data P and within the region except for the margin region 6, in the last page of the job. This can locate the information included in the emphasis region F1 (the corresponding region F2) and desired to be noted by a reader, on the last page. Therefore, the information desired to be noted by the reader can be put together on the last page.

The control unit 1 performs any one or a plurality of: the attachment of the underline, the attachment of the enclosing line, and the change of the color of the symbol included in the corresponding region F2, as the emphasis process. This can make the corresponding region F2 eye-catching.

The control unit 1 performs the emphasis process on the respective page image data P of the job to be executed from now with an identical color, and confirms whether the registered margin image 8 determined to be included in the page image data P of the jobs to be executed from now is the spent registered margin image 8 determined to be included in the page image data P of the job previously executed or not. In the case of the spent registered margin image 8, the control unit 1 at least differentiates the color used for emphasis in the job to be executed from now from the color used for emphasis in the job including the last spent registered margin image 8. This can differentiate the colors used for the emphasis process in the respective jobs of the document on which the identical registered margin image 8 is located. For example, on the respective printed matters of the documents to which similar header and footer are attached, the colors attached to the corresponding region F2 (the region whose position is identical to the position of the emphasis region F1) can be differentiated. Therefore, paper sheets where various documents are mixed can be easily sorted based on the colors used for emphasis.

The multi-functional peripheral 100 (the image forming apparatus) includes the above-described image processing apparatus 10 and the printing unit 5 that executes the print job based on the image data after the emphasis process. Only registering the margin image 7 and the emphasis region F1 within this margin image 7 can provide the image forming apparatus that automatically performs the emphasis process on the region (the corresponding region F2) including the information similar to that of the emphasis region F1, among the document that has the similar header image 7h and footer image 7f to print the document. This can provide the image forming apparatus that ensures the output of the document where the corresponding region F2 is eye-catching and the document is facilitated to understand what kind of document it is.

The disclosure is applicable for an image processing apparatus that processes image data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus comprising:
 a data input unit that receives an input of data for job used for a job;
 an operation panel that accepts a registration of a margin image located on a margin region preliminarily determined within a document in a page and a setting of an emphasis region within the margin image;
 a storage unit that stores data for emphasis including a registered margin image and positional data, the registered margin image being the margin image that has been registered, and the positional data indicating a position of the emphasis region in the registered margin image; and
 a control unit that determines whether the registered margin image is included in page image data that is image data of a page based on the data for job or not, and when the control unit determines that the registered margin image is included in the page image data, the control unit performs an emphasis process on an image of a corresponding region whose position at the registered margin image included in the page image data is identical to a position of the emphasis region in the registered margin image included in the stored data for emphasis, among the page image data.

2. The image processing apparatus according to claim 1, wherein:
the margin image is a header image or a footer image; and
the storage unit stores a registered header image, data for header emphasis, and data for footer emphasis as the data for emphasis, the registered header image being the header image registered as the registered margin image, the data for header emphasis including the positional data, and the data for footer emphasis including a registered footer image that is the footer image registered as the registered margin image and the positional data.

3. The image processing apparatus according to claim 2, wherein the control unit puts the image of the corresponding region in the footer region of the page image data when the registered header image is included in the page image data, and puts the image of the corresponding region in the header region of the page image data when the registered footer image is included in the page image data.

4. The image processing apparatus according to claim 2, wherein the control unit deletes a part except for the corresponding region among the header region of the page image data and locates an image where the corresponding region is enlarged on the header region when the registered header image is included in the page image data, and deletes a part except for the corresponding region among the footer region of the page image data and locates an image where the corresponding region is enlarged on the footer region when the registered footer image is included in the page image data.

5. The image processing apparatus according to claim 1, wherein the control unit puts the image of the corresponding region of any page included in a job, in a blank region within the page image data and within a region except for the margin region of a last page of the job.

6. The image processing apparatus according to claim 1, wherein the control unit performs any one or a plurality of: an attachment of an underline, an attachment of an enclosing line, and a color change of a symbol included in the corresponding region, as the emphasis process.

7. The image processing apparatus according to claim 1, wherein the control unit:
performs the emphasis process on each of the page image data of a job to be executed with an identical color;
confirms whether the registered margin image determined to be included in the page image data of the job to be executed is a spent registered margin image determined to be included in the page image data of a job previously executed or not; and
in a case of the spent registered margin image, at least differentiates a color used for emphasis in the job to be executed from a color used for emphasis in a job including the last spent registered margin image.

8. An image forming apparatus comprising:
the image processing apparatus according to claim 1; and
a printing unit that executes a print job based on image data after the emphasis process.

* * * * *